(12) United States Patent  (10) Patent No.: US 8,701,497 B2
Grenning  (45) Date of Patent: Apr. 22, 2014

(54) FLUID FLOW TESTING SYSTEM

(76) Inventor: Frederick H. Grenning, Lake Bluff, IL (US)

( * ) Notice: Subject to any disclaimer, the term of this patent is extended or adjusted under 35 U.S.C. 154(b) by 282 days.

(21) Appl. No.: 13/427,504

(22) Filed: Mar. 22, 2012

(65) Prior Publication Data

US 2013/0247674 A1   Sep. 26, 2013

(51) Int. Cl.
  *G01L 15/00*   (2006.01)
  *G01F 1/88*   (2006.01)
(52) U.S. Cl.
  CPC .. *G01L 15/00* (2013.01); *G01F 1/88* (2013.01)
  USPC ............................................. 73/716; 73/736
(58) Field of Classification Search
  CPC ............. G01L 15/00; G01L 7/18; G01L 7/08; G01F 23/14; G01F 1/88
  See application file for complete search history.

(56) References Cited

U.S. PATENT DOCUMENTS

| | | |
|---|---|---|
| 2,564,272 A | 8/1951 | Morton |
| 3,736,797 A | 6/1973 | Brown |
| 3,918,305 A | 11/1975 | Benedict |
| 4,343,193 A | 8/1982 | Dawson et al. |
| 4,555,952 A | 12/1985 | Jenkins |
| 4,776,210 A * | 10/1988 | Baillie et al. ............... 73/861.04 |
| RE34,610 E * | 5/1994 | Miller et al. .................. 137/597 |
| 6,874,375 B1 | 4/2005 | Grenning |
| 2012/0006119 A1 * | 1/2012 | Broden et al. .................. 73/716 |
| 2013/0333440 A1 * | 12/2013 | Hedtke .......................... 73/1.57 |

* cited by examiner

*Primary Examiner* — Andre Allen
(74) *Attorney, Agent, or Firm* — Miller, Matthias & Hull LLP

(57) ABSTRACT

Apparatus for measuring a differential pressure of a fluid flowing through a fluid line includes a nozzle having a nozzle interior wall defining a nozzle chamber. The nozzle interior wall tapers at a constant rate of area reduction to generate a laminar fluid flow. A differential pipe is coupled to the nozzle and fluidly communicates with a downstream portion of the fluid line. The differential pipe has a pipe interior wall defining a differential chamber fluidly communicating with the nozzle chamber. A first pressure port is formed in the nozzle and fluidly communicates with the nozzle chamber to obtain a first gauge pressure of the fluid, and a second pressure port is formed in the differential pipe and fluidly communicates with the differential chamber to obtain a second gauge pressure of the fluid.

16 Claims, 6 Drawing Sheets

FLUID FLOW TESTING SYSTEM

FIELD OF THE DISCLOSURE

The present disclosure relates generally to fluid flow testing apparatus and methods, and more particularly to methods and devices for measuring differential pressure of a fluid in a fluid line to determine a flow rate of the fluid.

BACKGROUND OF THE DISCLOSURE

Various fluid flow measuring devices and methods are known for use with fluid flow systems to measure a differential pressure across a piece of equipment. Based on the known characteristics of the equipment, the observed differential pressure can be converted into a fluid flow rate.

One common device used to measure fluid pressure is a pitot tube. The pitot tube may be positioned to measure fluid pressure at a specific point within a fluid line. The pitot tube typically includes an opening that may be placed in the stream of the fluid flow. To obtain an accurate reading, the pitot tube must be positioned so that the opening is located in the exact center of the stream and oriented parallel to the fluid flow path. A gauge may be operably coupled to the pitot tube to provide a pressure reading.

In a pitot tube, static pressure, which is atmospheric pressure in an open system, is compared to total pressure. Using Bernoulli's Equation, the pressure differential is then translated to a flow velocity. A gauge device may be graduated such that the readout is directly displayed as a fluid velocity.

Pitot tubes are commonly used where there is a desire to determine the flow rates of fluids for equipment testing. Fire pumps, in addition to other pumping equipment, often must be tested to ensure the equipment meets certain performance specifications, and therefore it is important to provide accurate devices and methods for determining fluid flow rates.

Many fire hydrant flow tests are conducted by taking a pitot reading directly from the nozzle on the fire hydrant. Due to inexact orifice diameter, excessive turbulence (which may cause fluctuations in the observed pressure level of +/−10 psi), and incorrect pitot tube positioning, these options give the least dependable readings.

Some devices integrate the pitot tube into the fluid line. A general problem with pitot tubes is that they are difficult to position to obtain accurate pressure readings. As noted above, the pitot tube must be positioned in the center of fluid flow and oriented parallel to the flow. As the pitot tube placement deviates from these requirements, the less accurate the pressure readings will be. Additionally, the pitot tube structure extends partially into the fluid line, and therefore is susceptible to damage by solids entrained in the fluid.

Conventional pitot tubes and other flow testing apparatus are also susceptible to inaccuracies due to turbulent fluid flow. Turbulence may be generated by valves, elbows, or other components that disrupt the flow of fluid through the pipe. Consequently, conventional devices typically require minimum lengths of straight pipe upstream and downstream of the flow testing apparatus to reduce turbulence and therefore improve accuracy of the data obtained by the flow testing apparatus.

U.S. Pat. No. 4,555,952 to Jenkins, issued on Dec. 3, 1985, discloses a differential pressure sensor. The pressure sensor responds to pressure differential across an orifice of known size. Here, the fluid pressure is measured on one side of an orifice plate. The fluid flows through the orifice. The pressure is also measured on the other side of the orifice plate. The two pressures are compared across a diaphragm. The pressure differential is transmitted to an electronic transducer located a distance safe enough away to protect the transducer from the temperature of the fluid. Thus, to measure pressure differential, the '952 patent requires an additional energy-consuming and turbulent-producing orifice plate which can affect the accuracy of the measurement.

U.S. Pat. No. 4,343,193 to Holden, issued on Aug. 10, 1982, discloses a flow measuring apparatus. The Holdren device measures pressure differential across a removable orifice plate. When a reading is not required, the orifice plate can be removed from the system piping. Again, the orifice plate of Holdren causes turbulence and consumes fluid energy, thereby decreasing the accuracy of the pressure readings.

U.S. Pat. No. 2,564,272 to Morton, issued on Aug. 14, 1956, discloses a flow meter attachment for hose nozzles. The nozzle is accompanied with a gauge tapping for a pressure gauge. The flow meter attachment includes two tubular sections. The inner tubular section has a plurality of holes extending through the wall such that there is fluid communication between the inside and outside of the inner tubular section. The gauge measures the pressure differential between the two tubular sections and the atmosphere. However, the Morton device does not allow for full measurement of the velocity component of Bernoulli's Equation since there is diminished flow in between the two tubular sections, thereby resulting in a less accurate reading. In addition, the '272 patent requires that the characteristics of the nozzle be known, such that the pressure gauge can be calibrated directly in fluid flow.

More recently, the present applicant developed a pitotless nozzle disclosed in U.S. Pat. No. 6,874,375 to Grenning, which issued on Apr. 5, 2005. The pitotless nozzle includes a constant pressure nozzle that promotes laminar flow through the nozzle. Laminar flow has a relatively constant pressure profile, and therefore an accurate pressure reading may be obtained from a periphery of the flow, without requiring components that obstruct the fluid flow. The pitotless nozzle, however, is limited to use in so-called "open" systems, where the pitotless nozzle is located immediately prior to the point at which the fluid is discharged from the fluid line to atmosphere. In applications where the fluid line to be tested does not have a nearby drain, a hose or other conduit must be attached to the fluid line and routed to a point where fluid may be discharged. The pitotless nozzle is attached to the end of the hose, and therefore the fluid line valve control may be remote from the pitotless nozzle. Consequently, to run a flow test, the user must open the fluid line control valve, move to the discharge point to observe the test data, and return to the fluid line control valve to close it once the test is complete. Requiring a user to travel between the fluid line control valve and the discharge point at the beginning and end of the test results in wasted time and fluid. Alternatively, two individuals having radio or other communication means must be used to run the test, necessitating otherwise unnecessary communication equipment and expending additional manpower.

SUMMARY OF THE DESCRIPTION

In accordance with one aspect of the disclosure, apparatus is provided for measuring a differential pressure of a fluid flowing through a fluid line having an upstream line connection and a downstream line connection. The apparatus includes a nozzle having a nozzle inlet end fluidly communicating with the upstream line connection and a nozzle outlet end, the nozzle including a nozzle interior wall defining a nozzle chamber extending from the nozzle inlet end to the nozzle outlet end, the nozzle interior wall having a nozzle inlet cross-sectional area at the nozzle inlet end that is greater than a nozzle outlet cross-sectional area at the nozzle outlet end, the nozzle interior wall tapering from the nozzle inlet end to the nozzle outlet end at a constant rate of area reduction. A differential pipe has a pipe inlet end coupled to the nozzle and a pipe outlet end fluidly communicating with the downstream line connection, the differential pipe having a pipe interior wall defining a differential chamber fluidly communicating with the nozzle chamber. A first pressure port is formed in the nozzle and fluidly communicates with the nozzle chamber to obtain a first gauge pressure of the fluid, and a second pressure port is formed in the differential pipe and fluidly communicates with the differential chamber to obtain a second gauge pressure of the fluid.

In another aspect of the disclosure that may be combined with any of these aspects, a testing assembly is for a fluid flowing through a fluid line having an upstream line connection and a downstream line connection. The testing assembly includes a nozzle having a nozzle inlet end fluidly communicating with the upstream line connection and a nozzle outlet end, the nozzle including a nozzle interior wall defining a nozzle chamber extending from the nozzle inlet end to the nozzle outlet end, the nozzle interior wall having a nozzle inlet cross-sectional area at the nozzle inlet end that is greater than a nozzle outlet cross-sectional area at the nozzle outlet end, the nozzle interior wall tapering from the nozzle inlet end to the nozzle outlet end at a constant rate of area reduction. A differential pipe has a pipe inlet end coupled to the nozzle and a pipe outlet end, the differential pipe having a pipe interior wall defining a differential chamber fluidly communicating with the nozzle chamber. A discharge valve has a valve inlet end coupled to the pipe outlet end and a valve outlet end fluidly communicating with the downstream line connection. A first pressure port is formed in the nozzle and fluidly communicates with the nozzle chamber to obtain a first gauge pressure of the fluid, and a second pressure port is formed in the differential pipe and fluidly communicates with the differential chamber to obtain a second gauge pressure of the fluid. A differential gauge is operably coupled to the first and second pressure ports and configured to determine a differential pressure of the fluid based on the first and second gauge pressures.

BRIEF DESCRIPTION OF THE DRAWINGS

For a more complete understanding of the disclosed methods and apparatuses, reference should be made to the embodiment illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE DISCLOSURE

Embodiments of testing equipment and methods used to measure a fluid flow through a fluid line are disclosed herein. The testing equipment includes a nozzle configured to generate a constant fluid pressure and having a first pressure port. A differential chamber is coupled to the nozzle and includes a second pressure port positioned to communicate with the fluid immediately downstream of the nozzle. A differential gauge may be operably coupled to the first and second pressure ports and configured to determine a pressure differential and/or a flow rate of the fluid. The differential chamber may have an outlet that fluidly communicates with a downstream line connection of the fluid line, so that the testing equipment may be installed "in-line" with the existing fluid line. As a result, the testing equipment need not be placed at a fluid discharge point, thereby reducing wasted time, fluid and man-power associated with "open" system equipment.

Figure 1:
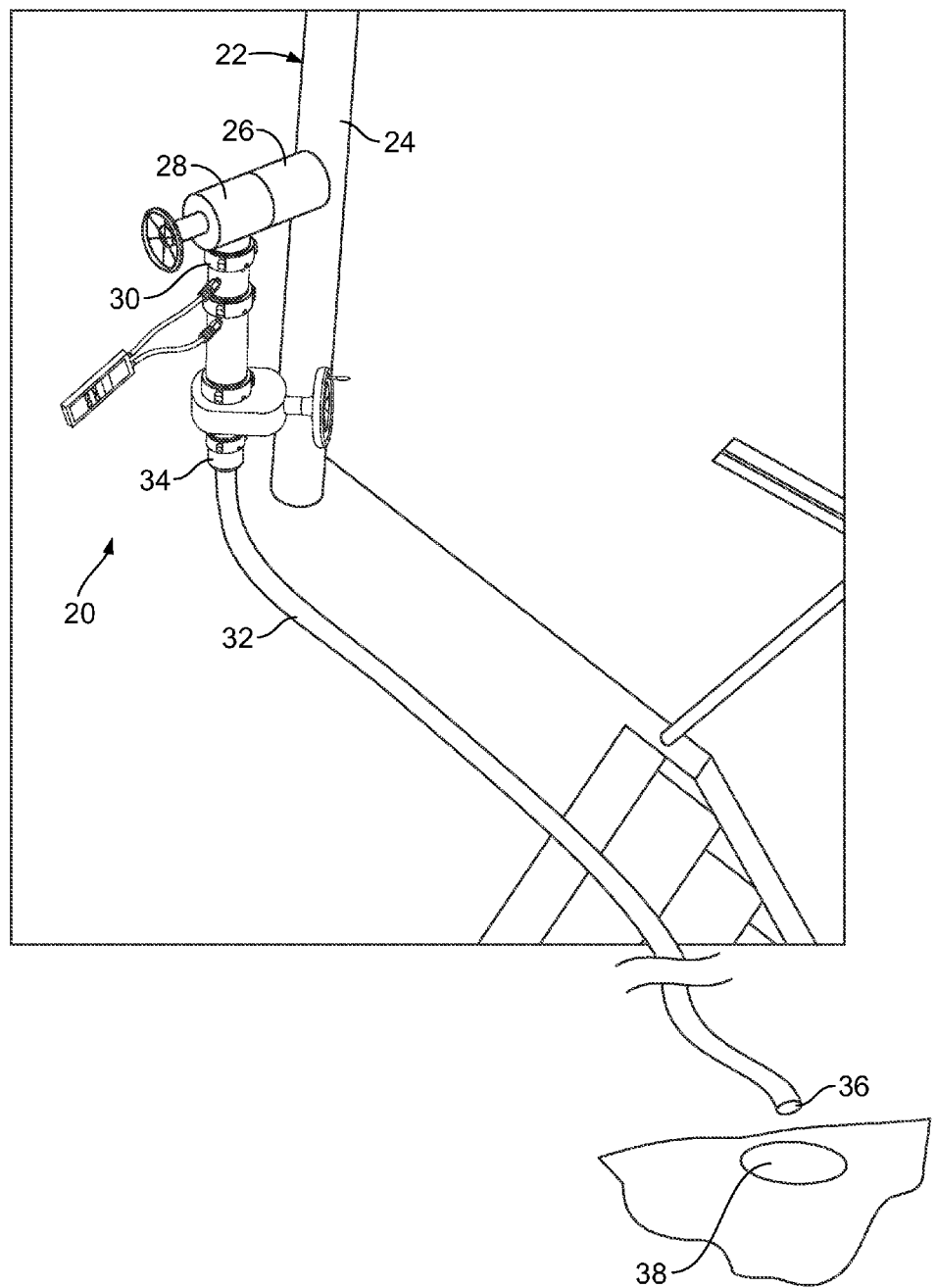
FIG. 1 is a schematic illustration of a fluid flow testing assembly according to the present disclosure in a temporary installation configuration on a fluid line.
Figure 2:
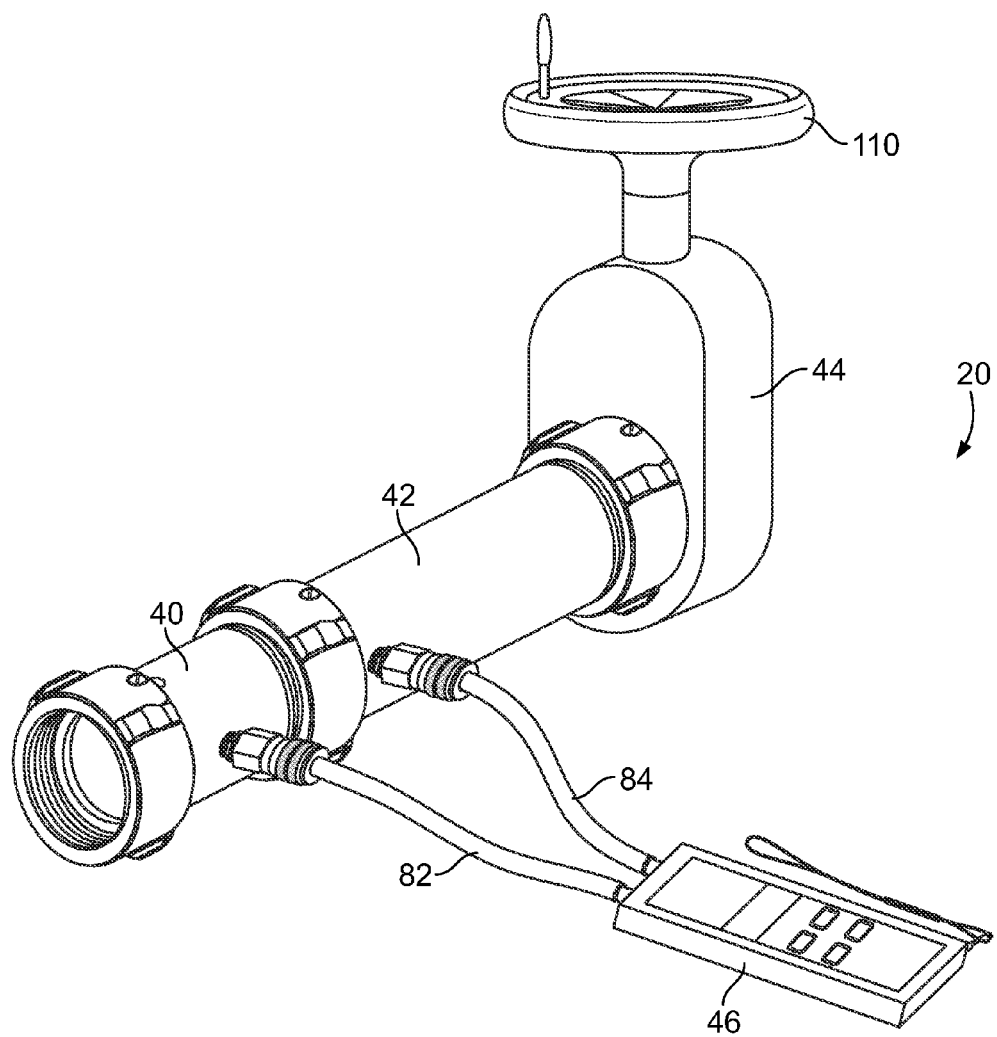
FIG. 2 is a perspective view of the fluid flow testing assembly of FIG. 1.

Referring to FIG. 1, an exemplary embodiment of a fluid flow testing assembly 20 is shown in a temporary installation configuration on an existing fluid line 22. The existing fluid line 22 includes a main pipeline 24 fluidly communicating with a fluid source (not shown) and a test tee 26. A test valve 28 is operably coupled to the test tee 26 and has an outlet 30 defining an upstream line connection. A hose 32 is coupled to the testing assembly 20 and has a hose inlet 34 defining a downstream line connection. A hose outlet 36 is positioned adjacent a drain 38. As best shown in FIG. 2, the testing assembly 20 generally includes a nozzle 40, a differential pipe 42, a discharge valve 44, and a differential gauge 46, as discussed in greater detail below.

Figure 3:
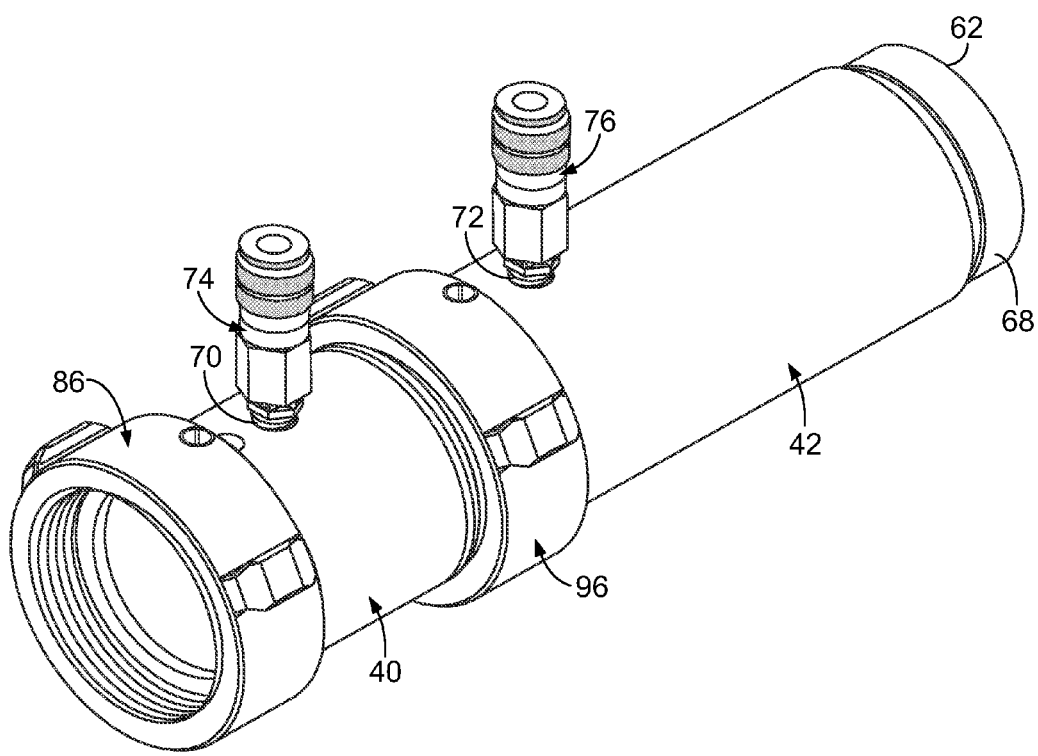
FIG. 3 is an enlarged perspective view of a nozzle and a differential pipe used in the fluid flow testing assembly of FIG. 1.
Figure 4:
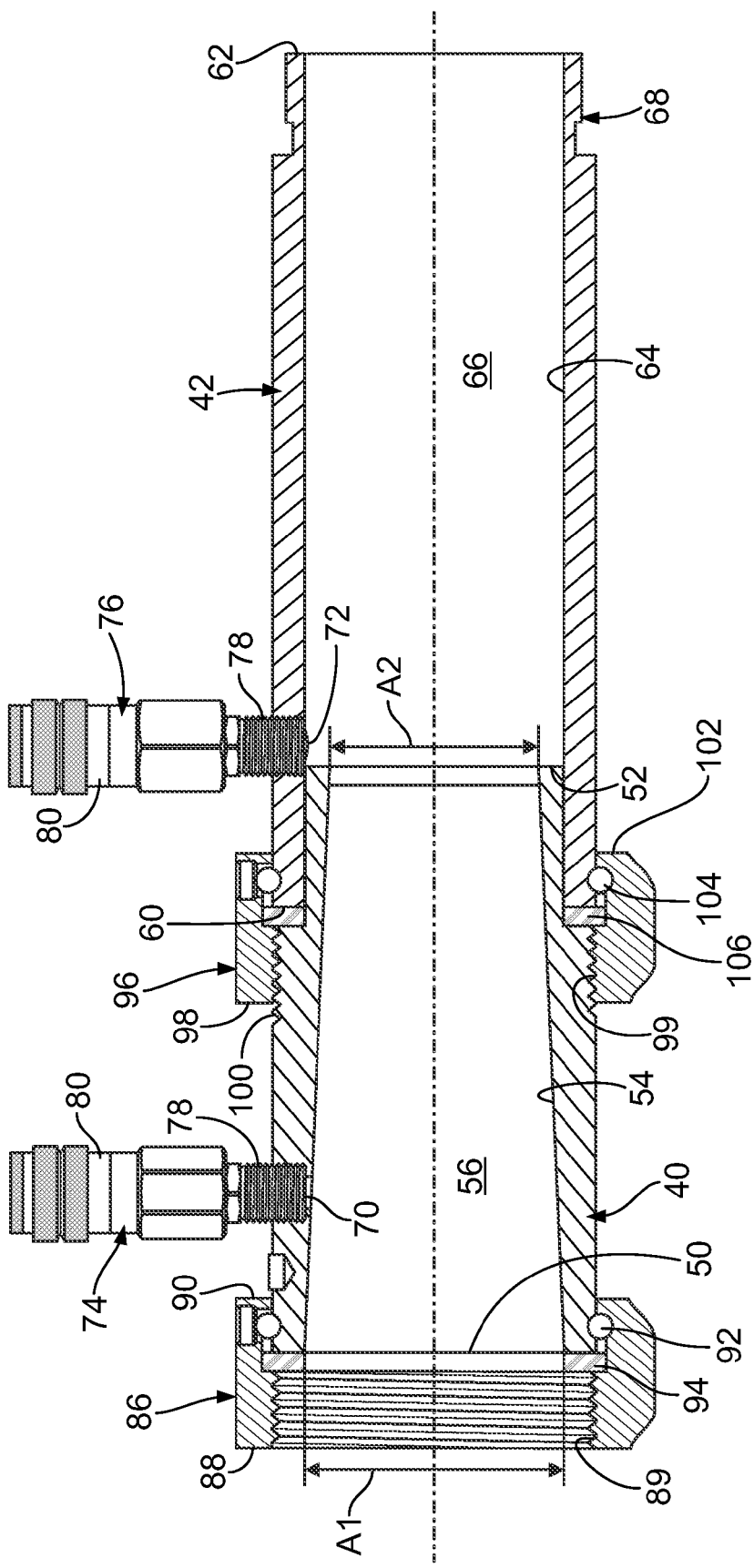
FIG. 4 is a side elevation view, in cross-section, of the nozzle and the differential pipe of FIG. 3.

FIGS. 3 and 4 illustrate in greater detail the nozzle 40 and differential pipe 42. The nozzle 40 includes a nozzle inlet end 50 that fluidly communicates with the upstream line connection (in this embodiment, the test valve outlet 30), and a nozzle outlet end 52. The nozzle includes an interior wall 54 defining nozzle chamber 56 that extends from the nozzle inlet end 50 to the nozzle outlet end 52. As best shown in FIG. 4, the nozzle interior wall 54 has an inlet cross-sectional area "A1" at the nozzle inlet end 50 and an outlet cross-sectional area "A2" at the nozzle outlet end 52, wherein the inlet cross-sectional area "A1" is greater than the outlet cross-sectional area "A2". The nozzle interior wall 54 tapers from the nozzle inlet end 50 to the nozzle outlet end 52 at a substantially constant rate of area reduction to produce a laminar flow through the nozzle 40.

Figure 5:
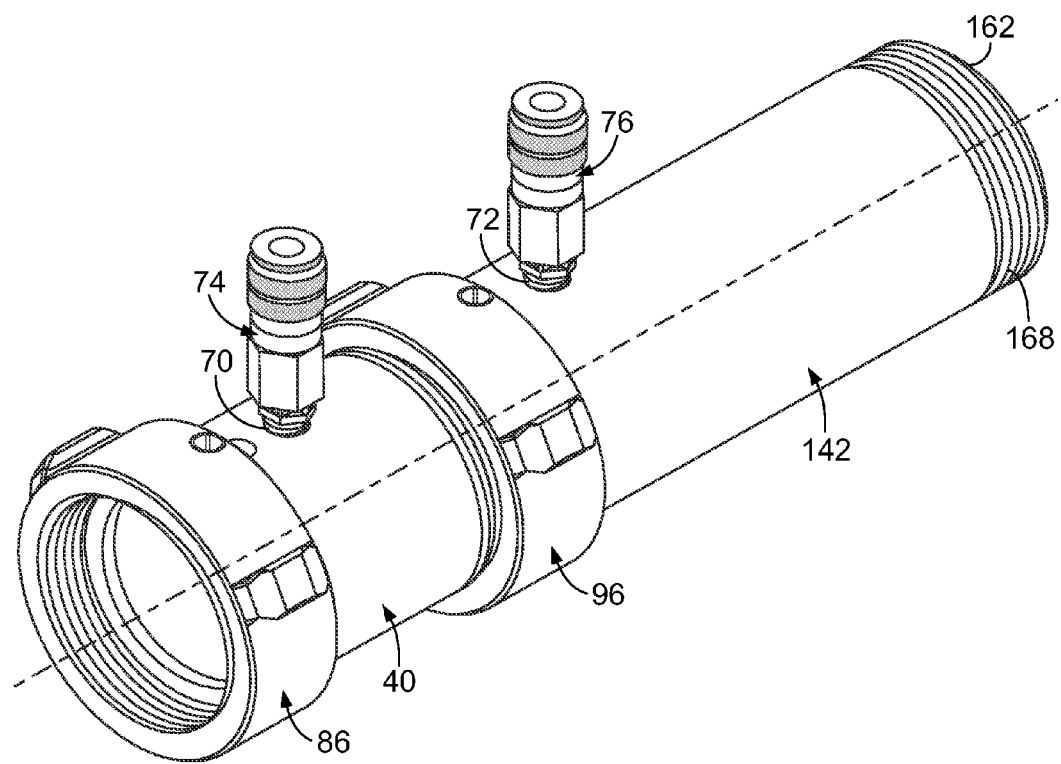
FIG. 5 is a perspective view of an alternative embodiment of a nozzle and differential pipe.

The differential pipe 42 includes a pipe inlet end 60 that is coupled to the nozzle 40 and a pipe outlet end 62 that fluidly communicates with the downstream line connection (in this embodiment, the hose inlet 34). The differential pipe 42 includes an interior pipe wall 64 defining a differential chamber 66 that fluidly communicates with the nozzle chamber 56. In the embodiment illustrated in FIGS. 3 and 4, the pipe outlet end 62 is formed with a hose coupling 68 that may be directly coupled to the hose 32. In an alternative embodiment illustrated in FIG. 5, a differential pipe 142 may have a pipe outlet end 162 formed with external threads 168, which may be used for attachment to the discharge valve 44, an alternative hose, another portion of the existing fluid line 22, or other type of downstream line connection.

First and second pressure ports 70, 72 are provided for obtaining first and second gauge pressures of fluid flowing through the testing assembly 20. The first pressure port 70 extends through a side of the nozzle 40 to fluidly communicate with the nozzle chamber 56. The second pressure port 72 extends through a side of the differential pipe 42 to fluidly communicate with the differential chamber 66. The second pressure port 72 may be positioned so that it is aligned with the nozzle outlet end 52 when the differential pipe 42 is coupled to the nozzle 40, as best shown in FIG. 4.

First and second pressure couplings 74, 76 may be coupled to the first and second pressure ports 70, 72, respectively. In the illustrated embodiment, each of the first and second pressure couplings 74, 76 includes a threaded fitting 78 that is received by complementary threads formed in the first and second pressure ports 70, 72. A hose fitting 80 is coupled to the threaded fitting and configured to receive an end of a pressure hose 82 or 84 (FIG. 2).

The first and second pressure hoses 82, 84 communicate the first and second gauge pressures from the first and second pressure ports 70, 72 to the differential gauge 46. The differential gauge 46 is configured to determine a differential pressure between the first and second gauge pressures. For example, the differential gauge may quantify the first and second gauge pressures and then determine the difference between those pressures. Additionally or alternatively, the differential gauge 46 may be configured to determine and display a fluid flow rate based on the differential pressure.

A nozzle coupling 86 may be provided for releasably attaching the nozzle 40 to the test valve outlet 30. In the exemplary embodiment, the nozzle coupling 86 includes a first end 88 having internal threads 89 for engaging complementary external threads (not shown) on the test valve outlet 30. The nozzle coupling 86 further includes a second end 90 that is rotatably coupled, such as by ball bearings 92, to the nozzle inlet end 50. Accordingly, the nozzle 40 may be rotated relative to the test valve outlet 30 without requiring complete disassembly. An inlet gasket 94 may be provided for sealing between the nozzle inlet end 50 and the test valve outlet 30.

Similarly, a pipe coupling 96 may be provided for releasably attaching the differential pipe 42 to the nozzle 40. As best shown in FIG. 4, the pipe coupling 96 includes a first end 98 having internal threads 99 for engaging complementary external threads 100 on the nozzle 40. The pipe coupling 96 further includes a second end 102 that is rotatably coupled, such as by ball bearings 104, to the nozzle outlet end 52. Accordingly, the differential pipe 42 may be rotated relative to the nozzle 40 without requiring complete disassembly. An outlet gasket 106 may be provided for sealing between the differential pipe 42 and the nozzle 40.

The discharge valve 44 may be coupled to the pipe outlet end 62 for selectively controlling fluid flow through the testing assembly 20. The discharge valve 44 may be movable between a closed position, in which fluid is prevented from flowing from the pipe outlet end 62 to the hose inlet 34, and an open position, in which fluid is permitted to flow from the pipe outlet end 62 to the hose inlet 34. The discharge valve 44 may include a handle 110 (FIG. 2) for actuating the valve between the open and closed positions.

Figure 6:
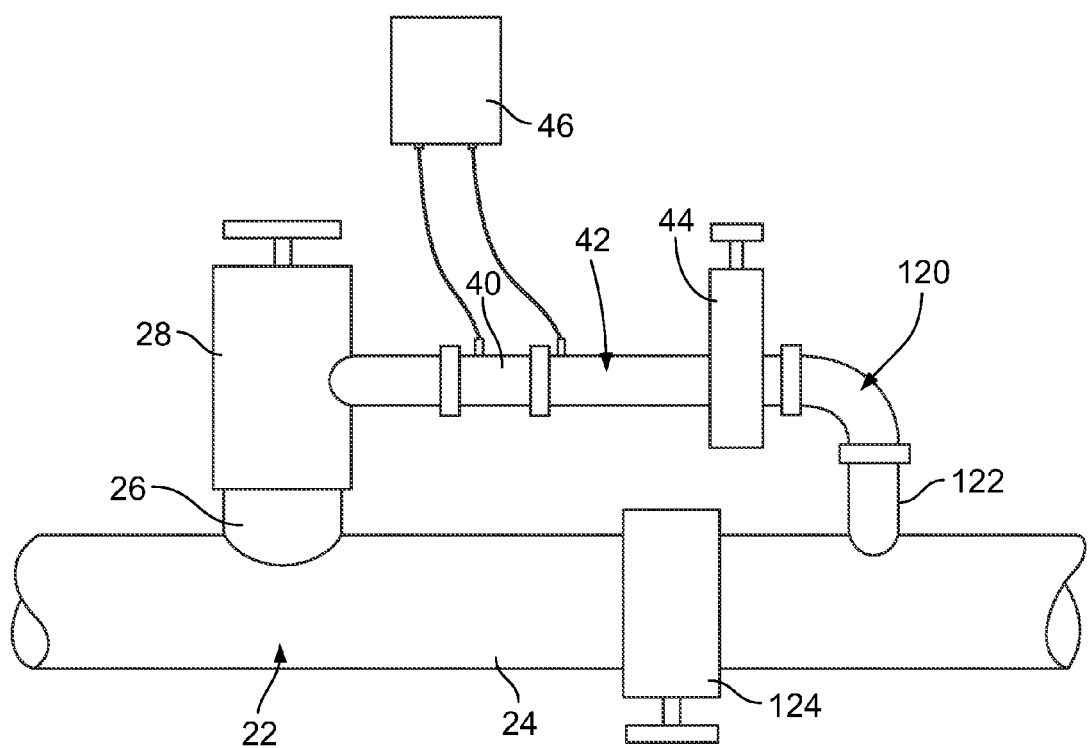
FIG. 6 is a schematic illustration of a fluid flow testing assembly according to the present disclosure in a permanent installation configuration on a fluid line.

FIG. 6 illustrates an alternative installation configuration in which the testing assembly 20 is permanently attached to a bypass line 120 of the existing fluid line 22. The existing fluid line 22 may again include the main pipeline 24, test tee 26, and test valve 28 that is operably coupled to the test tee 26 and has an outlet 30 defining an upstream line connection. A main valve 124 may be disposed in the main pipeline 24 for selectively shutting off fluid flow through the main pipeline 24 when desired, such as when flow is to be diverted through the bypass line 120 to conduct a test. Instead of connecting to the hose 32, the pipe outlet end 62 may fluidly communicate with a return pipe 122 that fluidly communicates with a downstream portion of the main pipeline 24. In this alternative embodiment, the testing assembly 20 may be permanently installed in the bypass line 120.

To perform a fluid flow test, a user may attach the nozzle inlet end 50 to the upstream line connection and the pipe outlet end 62 (with or without a discharge valve 44) to the downstream line connection. When the main valve 124 is operated to the closed position and the test valve 28 is operated to the open position, fluid will flow through the nozzle 40 and differential pipe 42 disposed in the bypass line 120. The taper of the interior wall 54 of the nozzle produces a laminar fluid flow that reduces turbulence, thereby permitting accurate pressure readings from a periphery of the nozzle chamber 56, such as at the first pressure port 70. Fluid flow immediately at the nozzle outlet end 52 is also sufficiently laminar to permit an accurate pressure reading at the second pressure port 72. These first and second gauge pressure readings may be used to determine a differential pressure and/or a flow rate of the fluid passing through the testing assembly 20.

The testing procedure using the testing assembly 20 is more convenient, reduces waste fluid, and reduces the manpower and expense required to conduct the fluid test. Because the testing assembly 20 may be installed in-line on an existing fluid line, the differential gauge 46 and other testing equipment may be positioned near the test valve 28. As a result, a single user may more efficiently conduct a test without requiring travel from the test valve 28 to the differential gauge 46 and back. Additionally, the nozzle 40 produces a laminar flow and therefore reduces or eliminates the need for additional straight pipe portions upstream and downstream of the pressure ports 70, 72 to reduce turbulence.

While only certain embodiments have been set forth, alternatives and modifications will be apparent from the above description to those skilled in the art. These and other alternatives are considered equivalents and within the spirit and scope of this disclosure and the appended claims.

What is claimed is:

1. Apparatus for measuring a differential pressure of a fluid flowing through a fluid line having an upstream line connection and a downstream line connection, the apparatus comprising:
    a nozzle having a nozzle inlet end fluidly communicating with the upstream line connection and a nozzle outlet end, the nozzle including a nozzle interior wall defining a nozzle chamber extending from the nozzle inlet end to the nozzle outlet end, the nozzle interior wall having a nozzle inlet cross-sectional area at the nozzle inlet end that is greater than a nozzle outlet cross-sectional area at the nozzle outlet end, the nozzle interior wall tapering from the nozzle inlet end to the nozzle outlet end at a constant rate of area reduction;
    a differential pipe having a pipe inlet end coupled to the nozzle and a pipe outlet end fluidly communicating with the downstream line connection, the differential pipe having a pipe interior wall defining a differential chamber fluidly communicating with the nozzle chamber;
    a first pressure port formed in the nozzle and fluidly communicating with the nozzle chamber to obtain a first gauge pressure of the fluid; and
    a second pressure port formed in the differential pipe and fluidly communicating with the differential chamber to obtain a second gauge pressure of the fluid.

2. The apparatus of claim 1, further comprising a differential gauge operably coupled to the first and second pressure ports and configured to determine a differential pressure of the fluid based on the first and second gauge pressures.

3. The apparatus of claim 2, in which the differential gauge is further configured to determine and display a fluid flow rate based on the differential pressure.

4. The apparatus of claim 1, in which the second pressure port in the differential pipe is substantially aligned with the nozzle outlet end.

5. The apparatus of claim 1, further comprising a pipe coupling configured to releasably secure the pipe inlet end to the nozzle outlet end.

6. The apparatus of claim 5, in which the pipe coupling is further configured to permit the differential pipe to rotate relative to the nozzle.

7. The apparatus of claim 1, further comprising a nozzle coupling configured to releasably secure the nozzle inlet end to the upstream line connection.

8. The apparatus of claim 7, in which the nozzle coupling is further configured to permit the nozzle to rotate relative to the upstream line connection.

9. The apparatus of claim 1, further comprising a discharge valve coupled to the differential pipe and configured to selectively control fluid communication between the pipe outlet end and the downstream line connection.

10. A testing assembly for a fluid flowing through a fluid line having an upstream line connection and a downstream line connection, the testing assembly comprising:
   a nozzle having a nozzle inlet end fluidly communicating with the upstream line connection and a nozzle outlet end, the nozzle including a nozzle interior wall defining a nozzle chamber extending from the nozzle inlet end to the nozzle outlet end, the nozzle interior wall having a nozzle inlet cross-sectional area at the nozzle inlet end that is greater than a nozzle outlet cross-sectional area at the nozzle outlet end, the nozzle interior wall tapering from the nozzle inlet end to the nozzle outlet end at a constant rate of area reduction;
   a differential pipe having a pipe inlet end coupled to the nozzle and a pipe outlet end, the differential pipe having a pipe interior wall defining a differential chamber fluidly communicating with the nozzle chamber;
   a discharge valve having a valve inlet end coupled to the pipe outlet end and a valve outlet end fluidly communicating with the downstream line connection;
   a first pressure port formed in the nozzle and fluidly communicating with the nozzle chamber to obtain a first gauge pressure of the fluid;
   a second pressure port formed in the differential pipe and fluidly communicating with the differential chamber to obtain a second gauge pressure of the fluid; and
   a differential gauge operably coupled to the first and second pressure ports and configured to determine a differential pressure of the fluid based on the first and second gauge pressures.

11. The testing assembly of claim 10, in which the differential gauge is further configured to determine and display a fluid flow rate based on the differential pressure.

12. The testing assembly of claim 10, in which the second pressure port in the differential pipe is substantially aligned with the nozzle outlet end.

13. The testing assembly of claim 10, further comprising a pipe coupling configured to releasably secure the pipe inlet end to the nozzle outlet end.

14. The testing assembly of claim 13, in which the pipe coupling is further configured to permit the differential pipe to rotate relative to the nozzle.

15. The testing assembly of claim 10, further comprising a nozzle coupling configured to releasably secure the nozzle inlet end to the upstream line connection.

16. The testing assembly of claim 15, in which the nozzle coupling is further configured to permit the nozzle to rotate relative to the upstream line connection.

* * * * *